(12) United States Patent
Lee et al.

(10) Patent No.: US 10,393,193 B2
(45) Date of Patent: Aug. 27, 2019

(54) CYLINDRICAL BI-DIRECTIONAL WEDGE CLUTCH

(71) Applicant: Schaeffler Technologies AG & Co. KG, Herzogenaurach (DE)

(72) Inventors: Brian Lee, York, SC (US); Benjamin Smith, Lilburn, GA (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 65 days.

(21) Appl. No.: 15/497,671

(22) Filed: Apr. 26, 2017

(65) Prior Publication Data
US 2018/0313412 A1    Nov. 1, 2018

(51) Int. Cl.
*F16D 41/063* (2006.01)
*F16D 15/00* (2006.01)
*F16D 23/12* (2006.01)

(52) U.S. Cl.
CPC ........... *F16D 41/063* (2013.01); *F16D 15/00* (2013.01)

(58) Field of Classification Search
CPC .................................................. F16D 41/063
USPC ........................................................ 192/78
See application file for complete search history.

(56) References Cited

U.S. PATENT DOCUMENTS

| | | | | |
|---|---|---|---|---|
| 1,770,290 A | * | 7/1930 | Wise | F16D 21/04 192/111.1 |
| 3,235,046 A | * | 2/1966 | Fulton | F16D 41/073 192/45.1 |
| 3,237,473 A | * | 3/1966 | Wassilieff | F16D 13/12 192/48.9 |
| 2015/0083539 A1 | * | 3/2015 | Lee | F16D 13/14 192/46 |
| 2016/0091034 A1 | * | 3/2016 | Lee | F16D 23/12 192/35 |

FOREIGN PATENT DOCUMENTS

CA      2315873      * 11/1998

* cited by examiner

*Primary Examiner* — Mark A Manley

(57) ABSTRACT

A cylindrical bi-directional wedge clutch, including: an axis of rotation; a carrier ring; a wedge plate including at least a portion disposed radially inwardly of the carrier ring; and a tapered hub disposed radially inwardly of the carrier ring, displaceable, for first and second locked modes in which the hub and the carrier ring are non-rotatably connected, in a first axial direction to contact the wedge plate and expand the wedge plate radially outwardly, and displaceable, for a free-wheel mode in which the tapered hub and the carrier ring are rotatable with respect to each other, in a second axial direction, opposite the first axial direction. For the first locked mode, the tapered hub and carrier rotate in a first circumferential direction. For the second locked mode, the tapered hub and carrier ring rotate in a second circumferential direction, opposite the first circumferential direction.

20 Claims, 8 Drawing Sheets

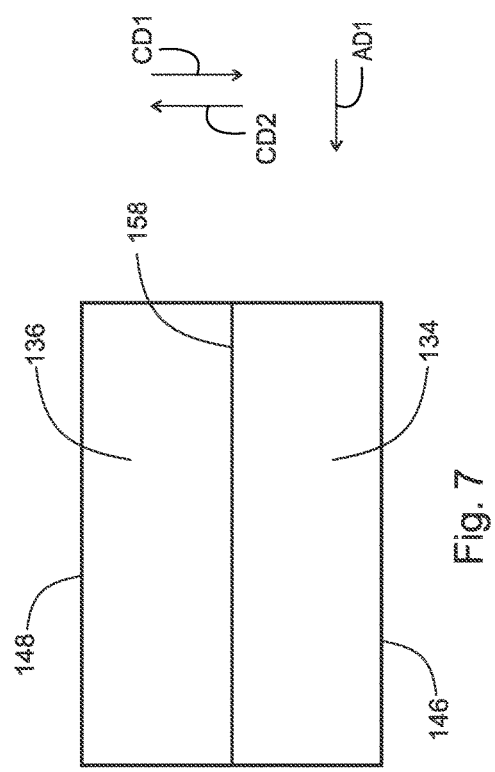
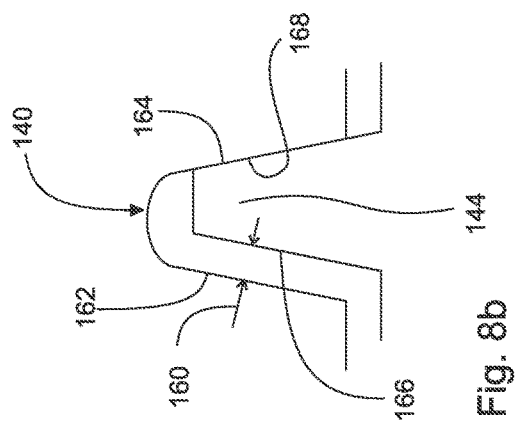
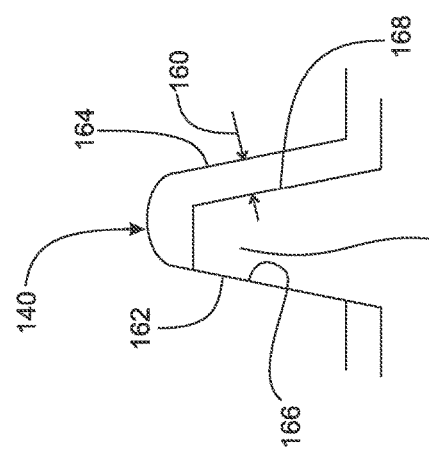

CYLINDRICAL BI-DIRECTIONAL WEDGE CLUTCH

TECHNICAL FIELD

The present disclosure relates to a cylindrical bi-directional wedge clutch, in particular, a wedge clutch that is controllably switchable between a free-wheel mode, a first locked mode for torque transfer in a first circumferential direction, and a second locked mode for torque transfer in a second circumferential direction.

BACKGROUND

Known wedge plate clutches are typically limited to one-way clutch applications and do not enable one-way and bi-directional operation.

SUMMARY

According to aspects illustrated herein, there is provided a cylindrical bi-directional wedge clutch, including: an axis of rotation; a carrier ring; a wedge plate including at least a portion disposed radially inwardly of the carrier ring; and a tapered hub disposed radially inwardly of the carrier ring, displaceable, for first and second locked modes in which the hub and the carrier ring are non-rotatably connected, in a first axial direction to contact the wedge plate and expand the wedge plate radially outwardly, and displaceable, for a free-wheel mode in which the tapered hub and the carrier ring are rotatable with respect to each other, in a second axial direction, opposite the first axial direction. For the first locked mode, the tapered hub and carrier rotate in a first circumferential direction. For the second locked mode, the tapered hub and carrier ring rotate in a second circumferential direction, opposite the first circumferential direction.

According to aspects illustrated herein, there is provided a cylindrical bi-directional wedge clutch, including: an axis of rotation; a carrier ring; a wedge plate including at least a portion disposed radially inwardly of the carrier ring, and a radially inner surface with first and second ramp surfaces tapering radially inwardly along a first axial direction; and a tapered hub displaceable, in a first axial direction, for first and second locked modes in which the tapered hub, the wedge plate, and the carrier ring are non-rotatably connected, to expand the wedge plate radially outwardly, displaceable in a second axial direction, opposite the first axial direction, for a free-wheel mode in which the tapered hub and the carrier ring are rotatable with respect to each other, and including at least a portion disposed radially inwardly of the wedge plate and a radially outer surface with third and fourth ramp surfaces tapering radially inwardly along the first axial direction. For the first locked mode, the tapered hub and carrier rotate in the first circumferential direction. For the second locked mode, the tapered hub and carrier rotate in a second circumferential direction, opposite the first circumferential direction.

According to aspects illustrated herein, there is provided a cylindrical bi-directional wedge clutch, including: an axis of rotation; a carrier ring; a wedge plate including a first circumferential end, a second circumferential end facing the first circumferential end in a first circumferential direction, and a gap, in the first circumferential direction, between the first and second circumferential ends; and a tapered hub in contact with the wedge plate, displaceable, for first and second locked modes in which the tapered hub, the wedge plate and the carrier ring are non-rotatably connected, within the gap in a first axial direction to increase a circumferential dimension of the gap, and displaceable within the gap in a second axial direction, opposite the first axial direction, for a free-wheel mode in which the tapered hub and the carrier ring are rotatable with respect to each other. For the first locked mode, the tapered hub and carrier rotate in the first circumferential direction. For the second locked mode, the tapered hub and carrier rotate in a second circumferential direction, opposite the first circumferential direction.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 7 is a view, radially outward from an axis of rotation, of a portion of a wedge plate in FIG. 1;

FIGS. 8A and 8B are details of area 8A/8B in FIG. 4; and,

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 9:
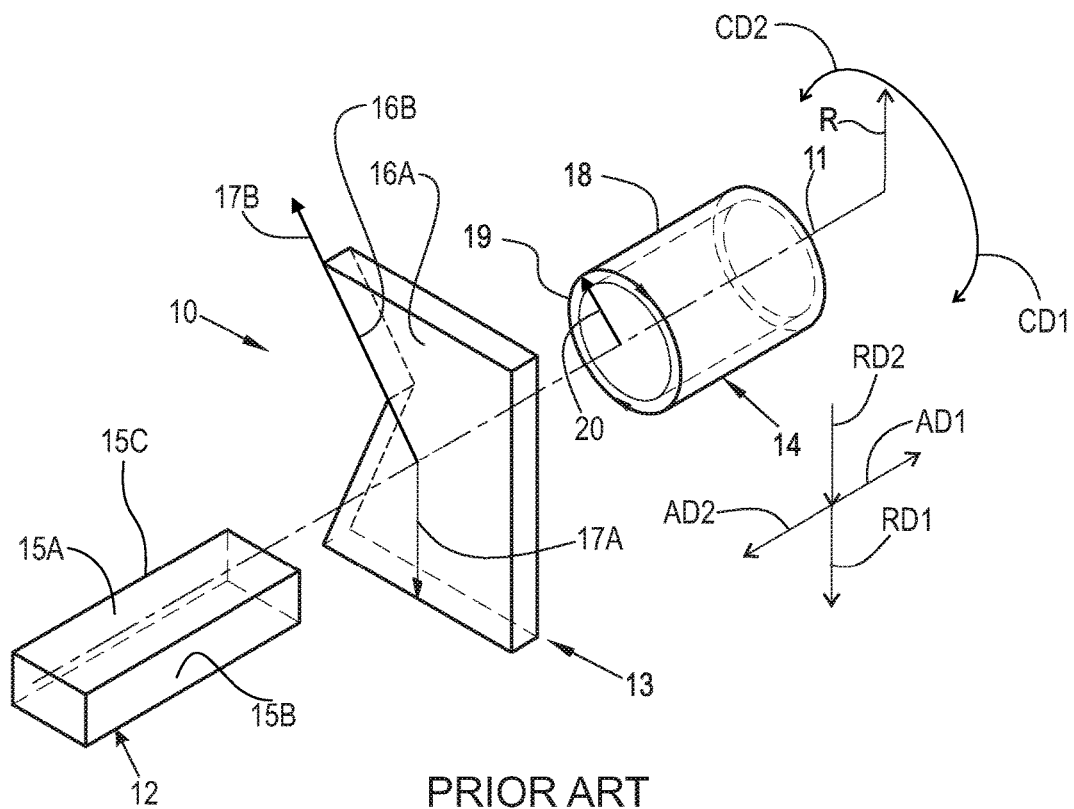
FIG. 9 is a perspective view of a cylindrical coordinate system demonstrating spatial terminology used in the present application.

FIG. 9 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, circumference 19, defined by radius 20, passes through surface 18.

Axial movement is in direction axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
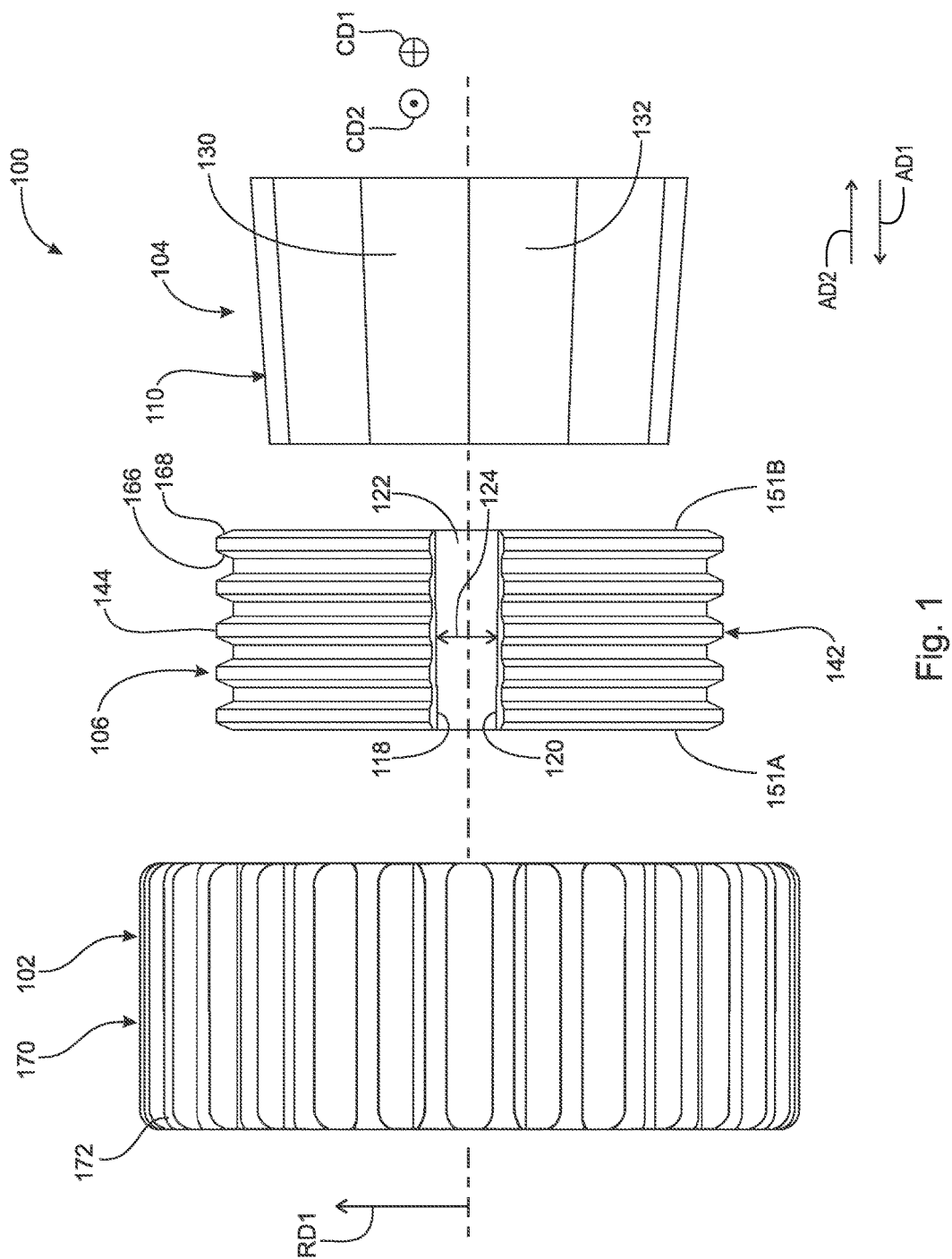
FIG. 1 is an exploded view of a cylindrical bi-directional clutch.

FIG. 1 is an exploded view of cylindrical bi-directional clutch 100.

Figure 2:
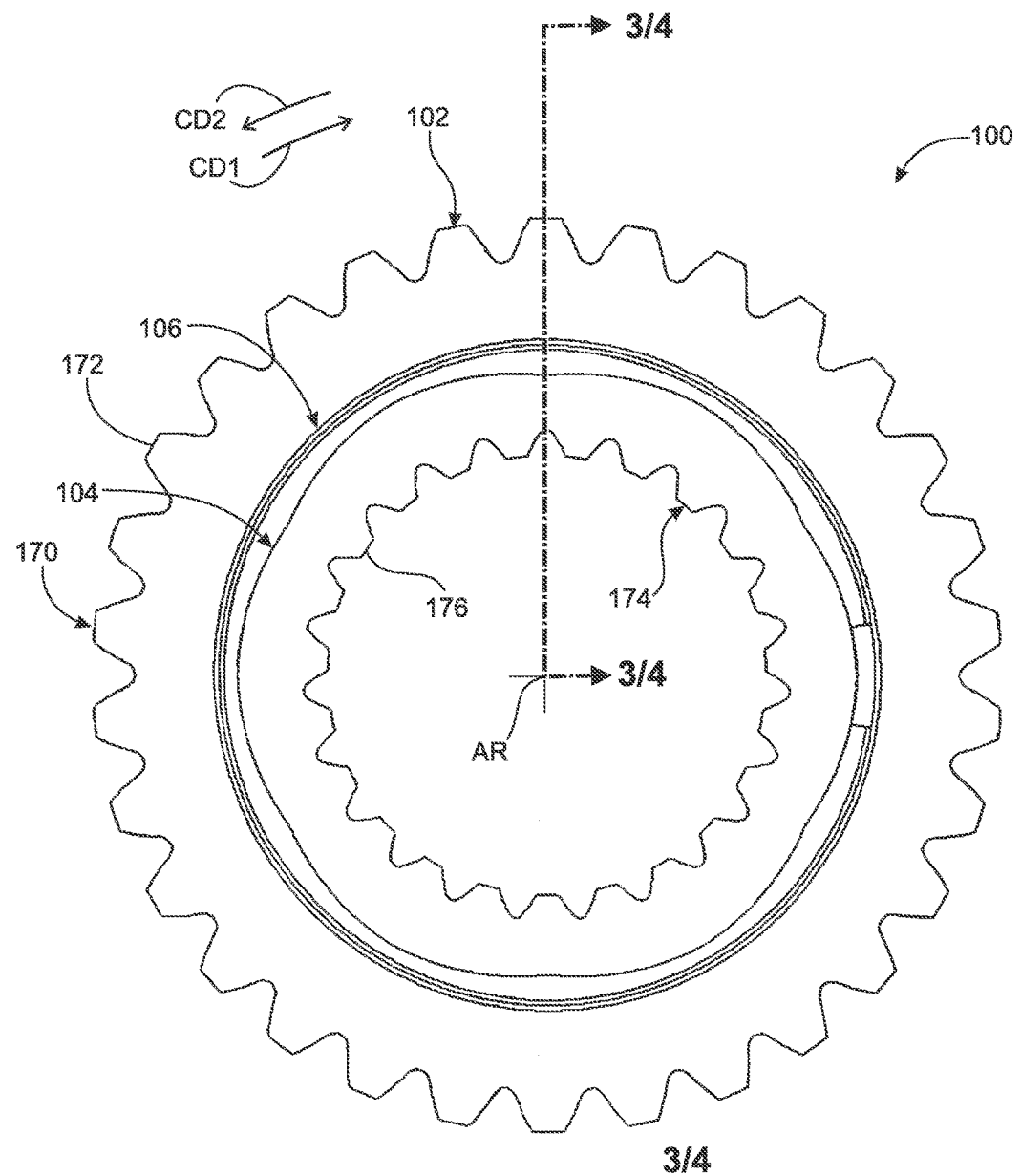
FIG. 2 is a front view of the cylindrical bi-directional wedge clutch in FIG. 1.

FIG. 2 is a front view of cylindrical bi-directional wedge clutch 100 in FIG. 1.

Figure 3:
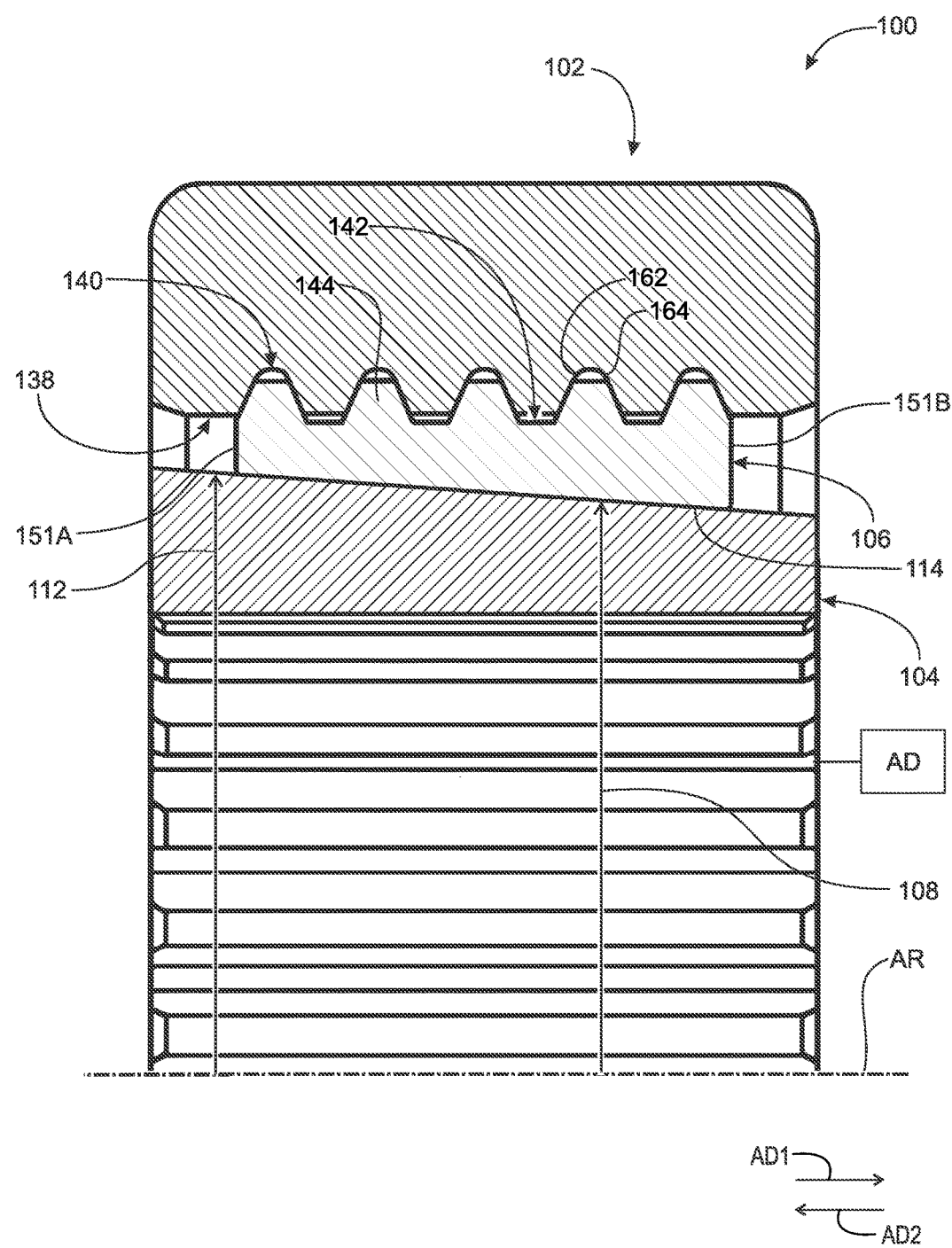
FIG. 3 is a cross-sectional view, generally along line 3/4-3/4 in FIG. 2, of the cylindrical bi-directional wedge clutch in FIG. 1 in a locked mode.

FIG. 3 is a cross-sectional view, generally along line 3/4-3/4 in FIG. 2, of cylindrical bi-directional wedge clutch 100 in FIG. 1 in a locked mode. The following should be viewed in light of FIGS. 1 through 3. Cylindrical bi-directional wedge clutch 100 includes: axis of rotation AR; carrier ring 102; tapered hub 104; and wedge plate 106. At least a portion of wedge plate 106 is radially disposed between carrier ring 102 and hub 104 and at least a portion of wedge plate 106 is radially inward of ring 102. Hub 104 is radially inward of ring 102. At least a portion of hub 104 is radially inward of plate 106. Hub 104 is displaceable in axial direction AD1, for first and second locked modes, to contact wedge plate 106 and expand wedge plate 106 radially outwardly in radial direction RD1 to initiate non-rotatable connection of hub 104 and ring 102.

For a first operating mode: hub 104 is arranged to receive torque in circumferential direction CD1 for the first locked mode; and hub 104 is arranged to receive torque in circumferential direction CD2, opposite direction CD1, for the second locked mode. Thus: in the first locked mode, hub 104 and carrier ring 102 rotate in circumferential direction CD1; in the second locked mode, hub 104 and carrier ring 102 rotate in circumferential direction CD2; and hub 104 transmits torque to ring 102.

For a second operating mode: mode, carrier ring 102 is arranged to receive torque in circumferential direction CD1 for the first locked mode; and carrier ring 102 is arranged to receive torque in circumferential direction CD2, opposite direction CD1, for the second locked mode. Thus: in the first locked mode, hub 104 and carrier ring 102 rotate in circumferential direction CD1; in the second locked mode, hub 104 and carrier ring 102 rotate in circumferential direction CD2; and ring 102 transmits torque to hub 104.

It should be understood that directions CD1 and CD2 can be reversed for the first and second operating modes.

Figure 4:
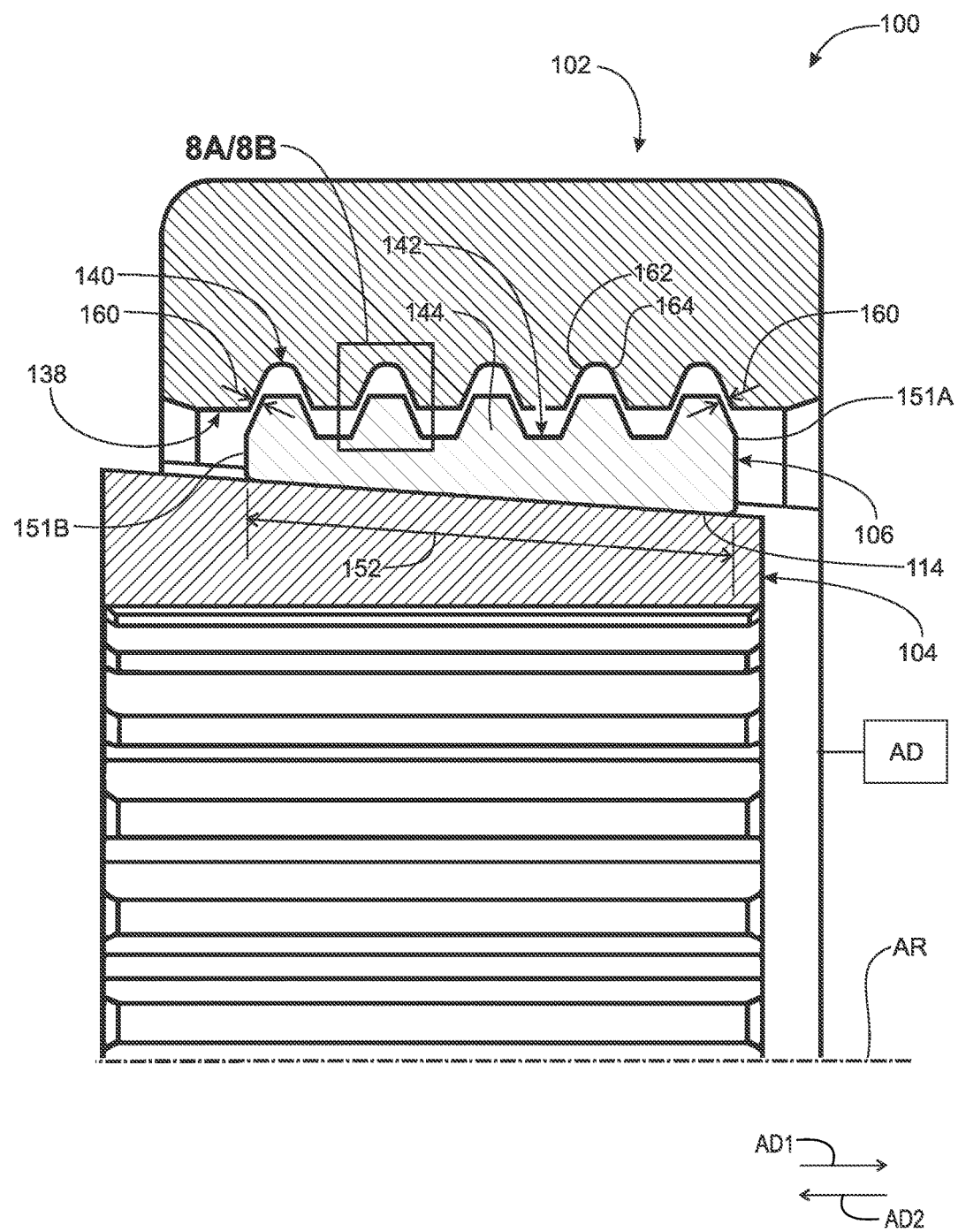
FIG. 4 is a cross-sectional view, generally along line 3/4-3/4 in FIG. 2, of the cylindrical bi-directional wedge clutch in FIG. 1 in a free-wheel mode.

FIG. 4 is a cross-sectional view, generally along line 3/4-3/4 in FIG. 2, of cylindrical bi-directional wedge clutch 100 in FIG. 1 in a free-wheel mode. The following should be viewed in light of FIGS. 1 through 4. The following discussion is directed to both the first and second operating modes of clutch 100. Hub 104 is displaceable in axial direction AD2, opposite axial direction AD1, to initiate a free-wheel mode in which ring 102 and hub 104 are rotatable with respect to each other.

Hub 104 includes radially outer surface 110 tapering radially inwardly along axial direction AD1. That is, outer diameter 112 of hub 104 decreases moving in direction AD1. Plate 106 includes radially inner surface 114 tapering radially inwardly along axial direction AD1. That is, radial dimension 108 of plate 106 decreases moving in direction AD1. To transition from the free-wheel mode to the first or second locked mode, radially outer surface 110 is arranged to slide along radially inner surface 114 in axial direction AD1. To transition from the first or second locked mode to the free-wheel mode, radially outer surface 110 is arranged to slide along radially inner surface 114 in axial direction AD2.

Wedge plate 106 includes circumferential ends 118 and 120 and gap 122. End 118 faces in direction CD2. End 120 faces end 118 in direction CD1. Gap 122 is circumferentially disposed between ends 118 and 120. That is, gap 122 separates ends 118 and 120 from each other in directions CD1 and CD2. Stated otherwise, plate 106 is discontinuous at gap 122. Plate 106 is continuous, in direction CD1 from end 118 to end 120. To transition from the free-wheel mode to the first or second locked mode, hub 104 is displaceable, in axial direction AD1, to increase dimension 124, in circumferential direction CD1, of gap 122.

Wedge plate 106 is preloaded to: urge end 118 toward end 120 and/or urge end 120 toward end 118. That is, plate 106 is preloaded to reduce dimensions 108 and 124. As a result of the preloading of plate 106, surface 114 is in contact with surface 110 for the free-wheel mode.

In an example embodiment, hub 104 extends past wedge plate 106 in direction AD1 or direction AD2, for example in the first and second locked modes. In an example embodiment, hub 104 extends past wedge plate 106 in direction AD1 and direction AD2, for example in the first and second locked modes.

Figure 5:
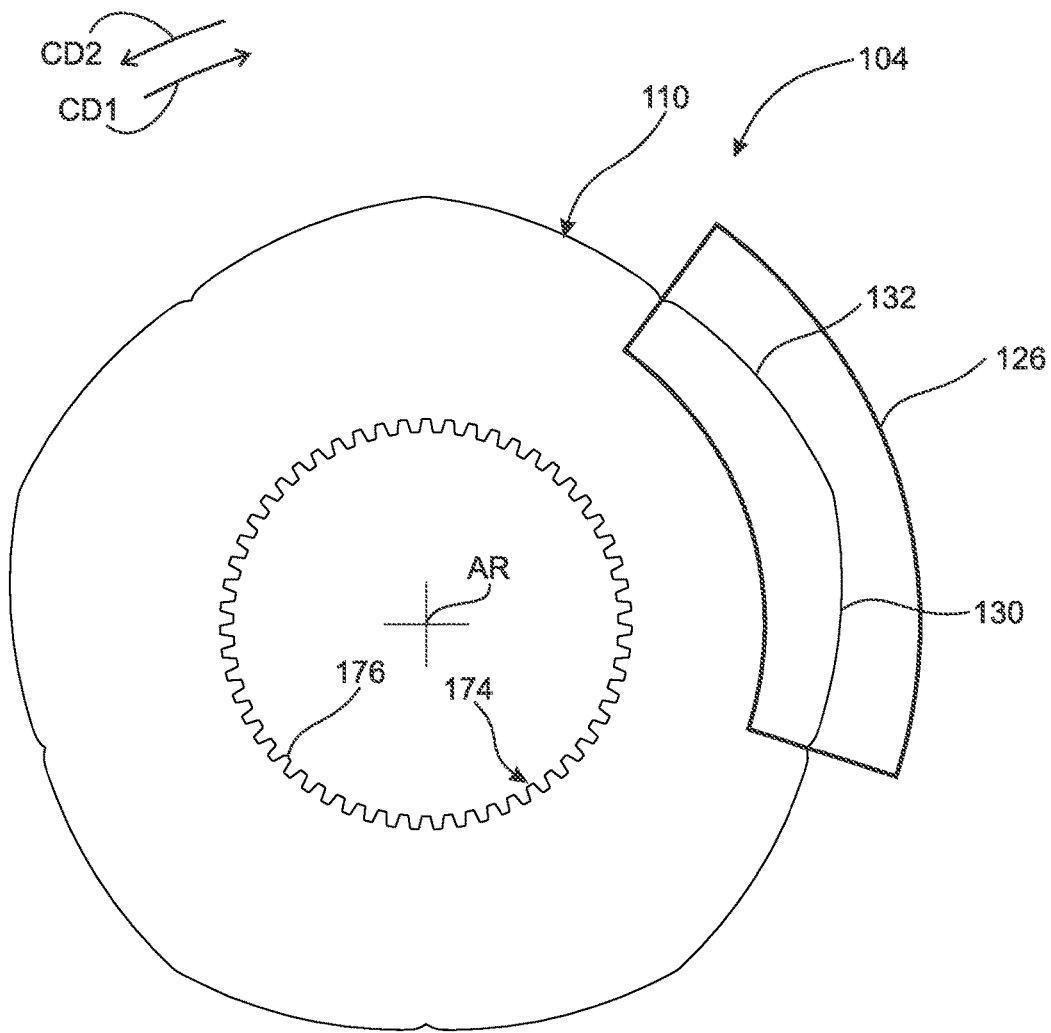
FIG. 5 is a front view of the tapered hub in FIG. 1.

FIG. 5 is a front view of hub 104 in FIG. 1.

Figure 6:
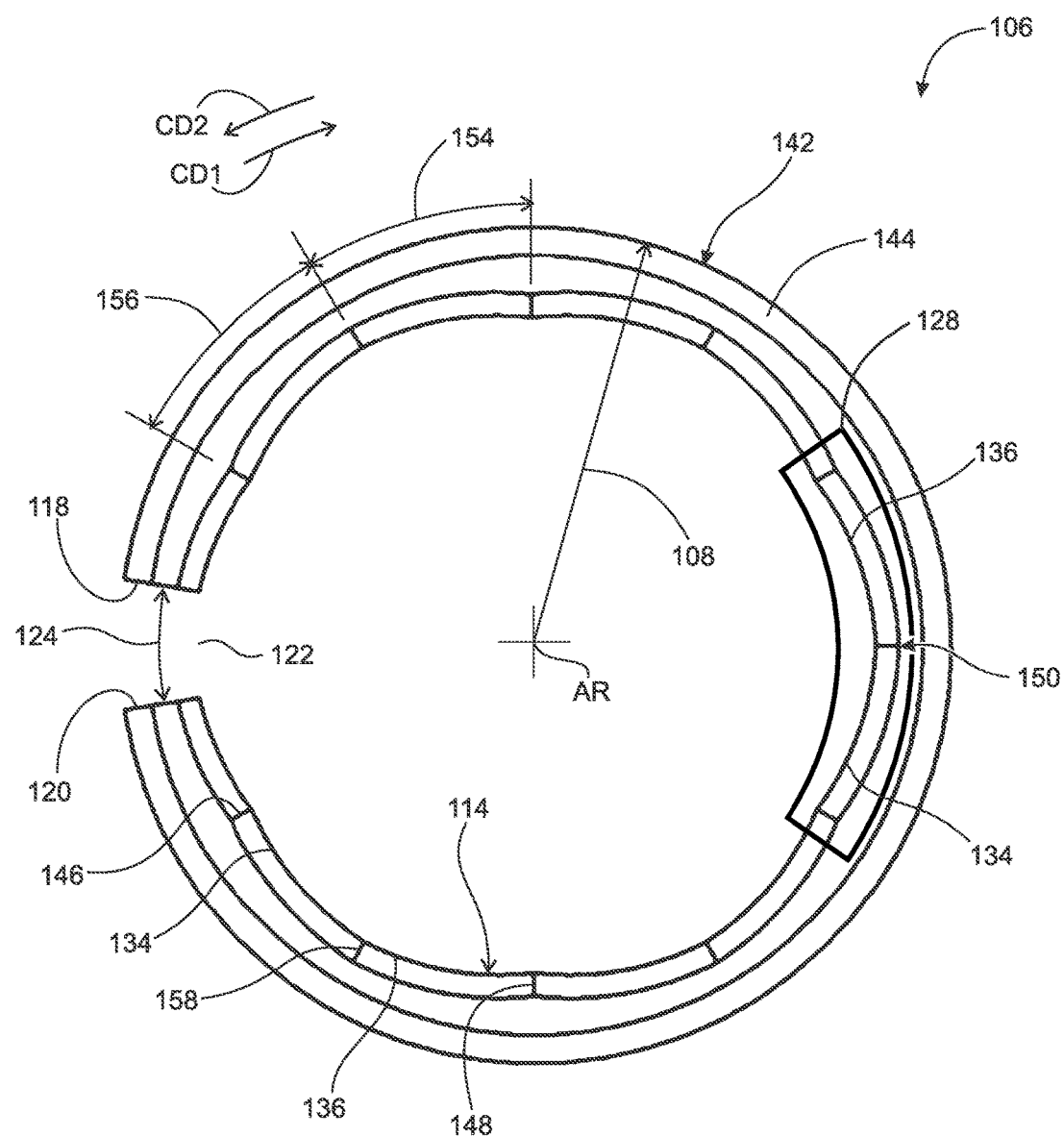
FIG. 6 is a front view of the wedge plate in FIG. 1.

FIG. 6 is a front view of wedge plate 106 in FIG. 1. The following should be viewed in light of FIGS. 1 through 6. Radially outer surface 110 includes ramp pairs 126 and surface 114 includes ramp pairs 128 in contact with ramp pairs 126. Each ramp pair 126 includes: ramp surface 130 sloping radially inwardly along direction CD1; and ramp surface 132 connected to ramp surface 130 and sloping radially inwardly from ramp surface 130 along circumferential direction CD2. Each ramp pair 128 includes: ramp surface 134 sloping radially inwardly along direction CD1; and ramp surface 136 connected to ramp surface 134 and sloping radially inwardly from ramp surface 134 along circumferential direction CD2. Ramp surfaces 130, 132, 134, and 136 slope radially inwardly along axial direction AD1.

Ring 102 includes radial inner surface 138 including circumferentially extending grooves 140. Respective grooves 140 are separated from each other in axial direction AD1. Wedge plate 106 includes radial outer surface 142 with protrusions 144. At least a portion of each protrusion 144 is located in a respective circumferentially extending groove 140. In an example embodiment, grooves 140 and protrusions 144 are circumferentially continuous. In the free-wheel mode, wedge plate 106 is rotatable with respect to ring 102. To initiate the first and second locked modes from the free-wheel mode, hub 104 is arranged to displace radial outer surface 142 radially outwardly to frictionally contact protrusions 144 with radial inner surface 138 at grooves 140.

FIG. 7 is a view, radially outward from axis of rotation AR, of a portion of wedge plate 106 in FIG. 1. Each ramp surface 134 includes edge 146 bounding surface 134 in the direction CD1. Each ramp surface 136 includes edge 148 bounding surface 134 in direction CD2. Each ramp pair 128 includes portion 150: connecting ramp surfaces 134 and 136 in direction CD1 or CD2; connecting axial ends 151A and 151B of plate 106, facing in directions AD1 and AD2, respectively, and having dimension 152 along surface 114 from end 151A to end 151B.

Each ramp surface 134 has circumferential dimension 154, in circumferential direction CD1, from portion 150 to edge 146. Each ramp surface 136 has circumferential dimension 156, in circumferential direction CD2, from portion 150 to edge 148. In an example embodiment, dimension 152 is greater circumferential dimension 154 or circumferential dimension 156. In an example embodiment, dimension 152 is greater than each of circumferential dimension 154 and circumferential dimension 156. In an example embodiment: portion 150 includes edge 158; dimension 154 is from the edge 158 to edge 146; and dimension 156 is from edge 148 to edge 158.

In known wedge plate clutches, circumferential dimensions of ramp surfaces are typically much smaller than an axial dimensions of ramp surfaces. Advantageously, for clutch 100: dimensions 154 and 156 can be made generally similar to circumferential dimension for known clutch plate wedges; and increasing dimension 152, with respect to known axial dimensions, greatly increases the area of contact between hub 104 and plate 106, greatly increasing the torque-carrying capacity of clutch 100.

FIGS. 8A and 8B are details of area 8A/8B in FIG. 4. The following should be viewed in light of FIGS. 1 through 8B. In the free-wheel mode, the preloading of plate 106: brings ramps 134 into contact with ramps 130, and ramps 136 into contact with ramps 132; and creates gaps 160 between surfaces 110 and 138. As noted above in the free-wheel mode, plate 106 rotates in unison with hub 104, and hub 104 and plate 106 are rotatable with respect to ring 102. Grooves 140 are formed in part by walls 162 and 164 and protrusions 144 are formed in part by walls 166 and 168. Gaps 160 are formed between: walls 162 and 166 and walls 164 and 168 (as shown in FIG. 4); walls 164 and 168 (as shown in FIG. 8A; or walls 162 and 166 (as shown in FIG. 8B). In FIGS. 8A and 8B, the contact of plate 106 with carrier 102 is not sufficient to prevent plate 106 from rotating with hub 102. That is, the contact does not frictionally engage protrusions 144 and ring 102 to cause rotation between plate 102 and hub 104 and the initiation of the first or second locked mode.

In an example embodiment, clutch 100 includes actuation device AD. Device AD can be any actuation device known in the art including, but not limited to: a hydraulic device; an electrical device; a mechanical device; an electro-mechanical device, or a pneumatic device. The discussion that follows assume the presence of device AD.

The following is directed to the first operating mode for clutch 100. To initiate the first locked mode from the free-wheel mode, hub 104 receives torque to rotate in direction CD1 and device AD displaces hub 104 in direction AD1 to force surface 142 radially outward (increase dimension 108 and extent 124). The outward displacement of surface 142 brings: walls 162 and 166 into frictional contact; and walls 164 and 168 into frictional contact. The frictional contact between walls 162 and 166 and between walls 164 and 168 creates a drag force opposing the rotation of plate 106 with hub 104. Rotation between plate 106 and hub 104 causes ramp surfaces 134 to slide radially outwardly along ramp surfaces 130 to displace plate 106 radially outwardly. The continued rotation of hub 104 in direction CD1: compressively connects surfaces 130 and 134; and compressively engages plate 106 with hub 104 and ring 102, non-rotatably connecting hub 104, plate 106, and ring 102. Thus, hub 104, plate 106, and ring 102 rotate in direction CD1 and torque in direction CD1 is transmitted from hub 104 to ring 102.

To initiate the second locked mode from the free-wheel mode, hub 104 receives torque to rotate in direction CD2 and device AD displaces hub 104 in direction AD1 to force surface 142 radially outward (increase dimension 108 and extent 124). The outward displacement of surface 142 brings: walls 162 and 166 into frictional contact; and walls 164 and 168 into frictional contact. The frictional contact between walls 162 and 166 and between walls 164 and 168 creates a drag force opposing the rotation of plate 106 with hub 104. Rotation between plate 106 and hub 104 causes ramp surfaces 136 to slide radially outwardly along ramp surfaces 132 to displace plate 106 radially outward. The continued rotation of hub 104 in direction CD2: compressively connects surfaces 132 and 136; and compressively engages plate 106 with hub 104 and ring 102, non-rotatably connecting hub 104, plate 106, and ring 102. Thus, hub 104, plate 106, and ring 102 rotate in direction CD2 and torque in direction CD2 is transmitted from hub 104 to ring 102.

The following is directed to the second operating mode for clutch 100. To initiate the first locked mode from the free-wheel mode, carrier ring 102 receives torque to rotate in direction CD1 and device AD displaces hub 104 in direction AD1 to force surface 142 radially outward (increase dimension 108 and extent 124). The outward displacement of surface 142 brings: walls 162 and 166 into frictional contact; and walls 164 and 168 into frictional contact. The frictional contact between walls 162 and 166 and between walls 164 and 168 creates a drag force opposing the rotation of plate 106 with hub 104. Rotation between plate 106 and hub 104 causes ramp surfaces 136 to slide radially outwardly along ramp surfaces 132 to displace plate 106 radially outwardly. The continued rotation of hub 104 in direction CD1: compressively connects surfaces 136 and 132; and compressively engages plate 106 with hub 104 and ring 102, non-rotatably connecting hub 104, plate 106, and ring 102. Thus, hub 104, plate 106, and ring 102 rotate in direction CD1 and torque in direction CD1 is transmitted from carrier ring 102 to hub 104.

To initiate the second locked mode from the free-wheel mode, carrier ring 102 receives torque to rotate in direction CD2 and device AD displaces hub 104 in direction AD1 to force surface 142 radially outward (increase dimension 108 and extent 124). The outward displacement of surface 142 brings: walls 162 and 166 into frictional contact; and walls 164 and 168 into frictional contact. The frictional contact between walls 162 and 166 and between walls 164 and 168 creates a drag force opposing the rotation of plate 106 with hub 104. Rotation between plate 106 and hub 104 causes ramp surfaces 134 to slide radially outwardly along ramp surfaces 130 to displace plate 106 radially outwardly. The continued rotation of hub 104 in direction CD2: compressively connects surfaces 130 and 134; compressively engages plate 106 with hub 104 and ring 102, non-rotatably connecting hub 104, plate 106, and ring 102. Thus, hub 104, plate 106, and ring 102 rotate in direction CD2 and torque in direction CD2 is transmitted from hub 104 to carrier ring 102.

The following is applicable to both the first and second operating modes for clutch 100. Energy is required to displace hub 104 in direction AD1 to initiate the first and second locked modes. For continued operation in the first and second locked modes, the energy urging hub 104 can be removed, reducing the energy budget for clutch 100, as long as torque continues to be applied to ring 102 or hub 104 as the case may be, in the original circumferential direction initiating the locked mode. That is, as long as the torque is applied in the original circumferential direction, the compressive engagement of surfaces 130 and 134 or surfaces 132 and 136 keeps plate 106 non-rotatably engaged with ring 102 and hub 104, without the necessity of hub 104 urging plate 106 radially outwardly.

Clutch 100 can transition between the first and second locked modes without displacing axially displacing hub 104. That is, once hub 104 is displaced to initiate the first or second locked mode, hub 104 can be left in place to enable transition between the first and second locked modes. For example, if clutch 100 is used in an all-wheel drive axle: in the first operating mode (analogous to a drive mode), an engine accelerates the vehicle in a forward direction (e.g., first locked mode), or in a reverse direction (e.g., second locked mode). For example, if clutch 100 is used in an all-wheel drive axle: in the second operating mode (analogous to a coast mode), an engine deaccelerates the vehicle in one direction (e.g., first locked mode), or in an opposite direction (e.g., second locked mode).

To transition from the first or second locked mode to the free-wheel mode, device AD displaces hub 104 in direction AD2 and the torque being supplied to ring 102 or hub 104 is removed. The preloading of plate 106 causes dimension 108 and gap 124 to each decrease, contracting plate 106 radially inwardly until the frictional/compressive contact of walls 162 and 166, and walls 164 and 168 is lessened or completely removed. The lessening or removal of the frictional/compressive contact of walls 162 and 166, and walls 164 and 168 enables hub 104 and plate 106 to rotate with respect to ring 102.

In an example embodiment: ring 102 includes radial outer surface 170 with splines or teeth 172 arranged to non-rotatably connect to a shaft (not shown); and hub 104 includes radial inner surface 174 with splines or teeth 176 arranged to non-rotatably connect to a shaft (not shown). For example, torque received on the shaft connected to hub 104 is transmitted to the shaft connected to ring 102 for the first and second locked modes.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS 10 cylindrical system
11 axis of rotation
AD1 axial direction
AD2 axial direction
RD1 radial direction
RD2 radial direction
CD1 circumferential direction
CD2 circumferential direction
R radius
12 object
13 object
14 object
15A surface
15B surface
15C edge
16A surface
16B edge
17A radius
17B radius
18 surface
19 circumference
20 radius
AR axis of rotation
100 cylindrical bi-directional clutch
AR axis of rotation
102 carrier ring
104 tapered hub
106 wedge plate
108 radial dimension of wedge plate
110 radial outer surface of hub 104
112 diameter of hub 104
114 radial inner surface of plate 106
118 circumferential end of plate 106
120 circumferential end of plate 106
122 gap between ends 118 and 120
124 dimension of gap 122
126 ramp pairs on surface 110
128 ramp pairs on surface 114
130 ramp surface for pair 126
132 ramp surface for pair 126
134 ramp surface for pair 128
136 ramp surface for pair 128
138 radial inner surface of ring 102
140 grooves in surface 138
142 radial outer surface of plate 106
144 protrusions on surface 142
146 edge of surface 134
148 edge of surface 136
150 portion of pair 128
151A axial end of plate 106
151B axial end of plate 106
152 dimension of along surface 114
154 circumferential dimension of surface 134
156 circumferential dimension of surface 136
158 edge in portion 150
160 gap between surfaces 110 and 114
162 wall of groove 140
164 wall of groove 140
166 wall of protrusion 144
168 wall of protrusion 144
AD actuation device
170 radial outer surface of ring 102
172 splines on ring 102
174 radial inner surface of hub 104
176 splines on surface 174

The invention claimed is:

1. A cylindrical bi-directional wedge clutch, comprising:
a carrier ring;
a wedge plate including at least a portion disposed radially inwardly of the carrier ring, and a radially inner surface with a first ramp surface sloping radially inwardly in a first circumferential direction; and, a tapered hub tapering radially inwardly in a first axial direction, disposed radially inwardly of the carrier ring, including a radially outer surface with a second ramp surface sloping radially inwardly in the first circumferential direction, displaceable, for first locked modes and second locked modes, in the first axial direction to contact the wedge plate and expand the wedge plate radially outwardly and displaceable, for a free-wheel mode in which the tapered hub and the carrier ring are rotatable with respect to each other, in a second axial direction, opposite the first axial direction, wherein the first ramp surface is in contact with the second ramp surface; wherein for a first locked mode of a first operating mode, the tapered hub is arranged to transmit a first torque to the carrier ring; wherein for a second locked mode of a second operating mode, the carrier ring is arranged to transmit a second torque to the tapered hub; and wherein in the free-wheel mode, the tapered hub and the wedge plate rotate in unison.

2. The cylindrical bi-directional wedge clutch of claim 1, wherein for the first locked mode of the first operating mode, the tapered hub is arranged to receive the first torque in the first circumferential direction; wherein for a second locked mode of the first operating mode, the tapered hub is arranged to receive a third torque in a second circumferential direction opposite the first circumferential direction and transmit the third torque to the carrier ring; wherein for a first locked mode of the second operating mode, the carrier ring is arranged to receive a fourth torque in the first circumferential direction and to transmit the fourth torque to the tapered hub; and wherein for the second locked mode of the second operating mode, the carrier ring is arranged to receive the second torque in the second circumferential direction.

3. The cylindrical bi-directional wedge clutch of claim 2, wherein the tapered hub includes a third ramp surface connected to the second ramp surface and sloping radially outwardly from the second ramp surface in the first circumferential direction, and a first ramp pair including the second ramp surface and the third ramp surface; and wherein the wedge plate includes a fourth ramp surface connected to the first ramp surface and sloping radially outwardly from the first ramp surface in the first circumferential direction, and a second ramp pair in contact with the first ramp pair and including the first ramp surface and the fourth ramp surface.

4. The cylindrical bi-directional wedge clutch of claim 3, wherein for the first locked mode of the first operating mode, the second ramp surface is arranged to displace the wedge plate radially outwardly to non-rotatably connect the tapered hub, the wedge plate and the carrier ring; and wherein for the second locked mode of the second operating mode, the third ramp surface is arranged to displace the wedge plate radially outwardly to non-rotatably connect the tapered hub, the wedge plate and the carrier ring.

5. The cylindrical bi-directional wedge clutch of claim 3, wherein for the first operating mode, in the first locked mode, the first ramp surface is arranged to compressively engage the second ramp surface and in the second locked mode, the fourth ramp surface is arranged to compressively engage the third ramp surface; and, wherein for the second operating mode, in the first locked mode, the second ramp surface is arranged to compressively engage the first ramp surface; and in the second locked mode, the third ramp surface is arranged to compressively engage the fourth ramp surface.

6. The cylindrical bi-directional wedge clutch of claim 3, wherein the first, second, third and fourth ramp surfaces slope radially inwardly along the first axial direction.

7. The cylindrical bi-directional wedge clutch of claim 1, wherein the radially outer surface of the tapered hub tapers radially inwardly along the first axial direction, and the wedge plate includes a radially inner surface in contact with the radially outer surface.

8. The cylindrical bi-directional wedge clutch of claim 7, wherein the radially inner surface tapers radially inwardly along the first axial direction; wherein to transition from the free-wheel mode to the first or second operating mode, the radially outer surface is arranged to slide along the radially inner surface in the first axial direction; and wherein to transition from the first or second operating mode to the free-wheel mode, the radially outer surface is arranged to slide along the radially inner surface in the second axial direction.

9. The cylindrical bi-directional wedge clutch of claim 1, wherein the wedge plate includes a first circumferential end, a second circumferential end facing the first circumferential end in the first circumferential direction, and a gap between the first and second circumferential ends; and wherein the wedge plate is discontinuous at the gap.

10. The cylindrical bi-directional wedge clutch of claim 9, wherein the wedge plate is continuous, in the first circumferential direction, from the first circumferential end to the second circumferential end.

11. The cylindrical bi-directional wedge clutch of claim 9, wherein the wedge plate is preloaded to urge the first circumferential end toward the second circumferential end, or urge the second circumferential end toward the first circumferential end.

12. The cylindrical bi-directional wedge clutch of claim 1, wherein the tapered hub extends past the wedge plate in the first or second axial direction or the tapered hub extends past the wedge plate in the first and second axial directions.

13. The cylindrical bi-directional wedge clutch of claim 1, wherein the carrier includes a radial inner surface including a plurality of circumferentially extending grooves, respective grooves are separated from each other in the first axial direction, the wedge plate includes a radial outer surface with a plurality of protrusions, and at least a portion of each protrusion is located in a respective circumferentially extending groove; and wherein in the free-wheel mode, the wedge plate is rotatable with respect to the carrier, and to initiate the first and second operating modes, the tapered hub is arranged to displace the radial outer surface radially outwardly to frictionally contact the plurality of protrusions with the radial inner surface.

14. A cylindrical bi-directional wedge clutch, comprising:
a carrier ring;
a wedge plate including at least a portion disposed radially inwardly of the carrier ring, and a radially inner surface with a first ramp surface and a second ramp surface each tapering radially inwardly along a first axial direction; and,
a tapered hub displaceable, in the first axial direction for first locked modes and second locked modes to expand the wedge plate radially outwardly, and displaceable in a second axial direction, opposite the first axial direction, for a free-wheel mode in which the tapered hub and the carrier ring are rotatable with respect to each other, the tapered hub including at least a portion disposed radially inwardly of the wedge plate and a radially outer surface with a third ramp surface and a fourth ramp surface each tapering radially inwardly along the first axial direction, wherein in the free-wheel mode, the tapered hub and the wedge plate rotate in unison; wherein for a first locked mode of a first operating mode, the tapered hub is arranged to receive a first torque and to transmit the first torque to the carrier ring; and wherein for a second locked mode of a second operating mode, the carrier ring is arranged to receive a second torque and to transmit the second torque to the tapered hub.

15. The cylindrical bi-directional wedge clutch of claim 14, wherein for the first locked mode of the first operating mode, the third ramp surface is arranged to displace the wedge plate radially outwardly to non-rotatably connect the tapered hub, the wedge plate and the carrier ring, and for the second locked mode of the second operating mode, the fourth ramp surface is arranged to displace the wedge plate radially outwardly to non-rotatably connect the tapered hub, the wedge plate and the carrier ring.

16. The cylindrical bi-directional wedge clutch of claim 14, wherein for the first locked mode of the first operating mode, the tapered hub is arranged to receive the first torque in a first circumferential direction; wherein for a second locked mode of the first operating mode, the tapered hub is arranged to receive a third torque in a second circumferential direction opposite the first circumferential direction and transmit the third torque to the carrier ring; wherein for a first locked mode of the second operating mode, the carrier ring is arranged to receive a fourth torque in the first circumferential direction and to transmit the fourth torque to the tapered hub; and wherein for the second locked mode of the second operating mode, the carrier ring is arranged to receive the second torque in the second circumferential direction.

17. The cylindrical bi-directional wedge clutch of claim 16, wherein for the first operating mode, in the first locked mode, the first ramp surface is arranged to compressively engage the third ramp surface and in the second locked mode, the second ramp surface is arranged to compressively engage the fourth ramp surface; and wherein for the second operating mode, in the first locked mode, the third ramp surface is arranged to compressively engage the first ramp surface and in the second locked mode, the fourth ramp surface is arranged to compressively engage the second ramp surface.

18. The cylindrical bi-directional wedge clutch of claim 14, wherein the wedge plate includes a first axial end and a second axial end; and wherein the first and second ramp surfaces slope radially inwardly in first and second circumferential directions, respectively, include first and second circumferential dimensions, respectively, and each include a first dimension, from the first axial end to the second axial end, greater than either of the first or second circumferential dimensions.

19. A cylindrical bi-directional wedge clutch, comprising:
a carrier ring;
a wedge plate including a radially inner surface with a first ramp surface sloping radially inwardly in a first circumferential direction, a first circumferential end, a second circumferential end facing the first circumferential end in a first circumferential direction, and a gap, in the first circumferential direction, between the first and second circumferential ends; and,
a tapered hub tapering radially inwardly in a first axial direction, including a radially outer surface with a second ramp surface sloping radially inwardly in the first circumferential direction, displaceable for first locked modes and second locked modes in the first axial direction to increase a circumferential dimension of the gap, and displaceable in a second axial direction, opposite the first axial direction, for a free-wheel mode in which the tapered hub and the carrier ring are rotatable with respect to each other, wherein the first ramp surface is in contact with the second ramp surface; wherein for a first locked mode of a first operating mode, the tapered hub is arranged to receive a first torque and to transmit the first torque to the carrier ring; and wherein for a second locked mode of a second operating mode, the carrier ring is arranged to receive a second torque and to transmit the second torque to the tapered hub.

20. The cylindrical bi-directional wedge clutch of claim 19, wherein for the first locked mode of the first operating mode, the tapered hub is arranged to receive the first torque in the first circumferential direction; wherein for a second locked mode of the first operating mode, the tapered hub is arranged to receive a third torque in a second circumferential direction opposite the first circumferential direction and transmit the third torque to the carrier ring; wherein for a first locked mode of the second operating mode, the carrier ring is arranged to receive a fourth torque in the first circumferential direction and to transmit the fourth torque to the tapered hub; and wherein for the second locked mode of the second operating mode, the carrier ring is arranged to receive the second torque in the second circumferential direction.

* * * * *